May 14, 1968 P. F. WILSON 3,383,465

DATA REGENERATOR

Filed March 30, 1964 3 Sheets-Sheet 1

INVENTOR.
PATRICK F. WILSON

BY Reynolds & Christensen

ATTORNEYS

May 14, 1968 P. F. WILSON 3,383,465

DATA REGENERATOR

Filed March 30, 1964 3 Sheets-Sheet 2

INVENTOR.
PATRICK F. WILSON

BY Reynolds & Christensen

ATTORNEYS

INVENTOR.
PATRICK F. WILSON

BY Reynolds & Christensen

ATTORNEYS 3,383,465

DATA REGENERATOR

Patrick F. Wilson, Bellevue, Wash., assignor to The Boeing Company, Seattle, Wash., a corporation of Delaware Filed Mar. 30, 1964, Ser. No. 355,722
19 Claims. (Cl. 178—70)

ABSTRACT OF THE DISCLOSURE

The present invention relates to data regenerators and more particularly to an improved data regenerator system of the type used in pulse communication systems. The details of a system are disclosed which system operates to regenerate the data signals in a pulse communication system when the data signals being transmitted and received have undergone various types of distortion. A signal evaluation system is disclosed which receives and evaluates each signal and then applies internally generated signals to other parts of the overall signal regeneration system in a manner which provides complete isolation of the signal input and signal output circuits of the overall system. Thus the problems normally associated with input signal fluctuations are avoided. Timing details showing the manner of system operation as well as a schematic circuit diagram of the signal evaluation section are disclosed.

Figure 1:
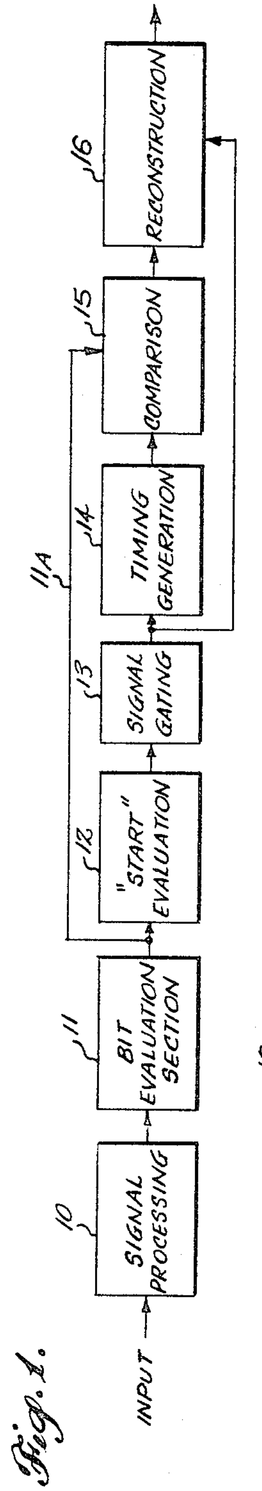

In the art of telegraphic communications information is transmitted and received in code using a sequential series of electrical pulses to represent the individual letters of the information being transmitted. Such systems of communications which utilize the presence or absence of a given signal level for the transmission of information are generally less sensitive to noise or outside influences than are conventional amplitude modulated systems, but even in pulse type communication systems various types of interference can cause problems in the receipt and decoding of information at a receiving station. Degradation of the signal information when transmitted over long distances has led to the widespread use of signal regenerators disposed between the source of the signals being transmitted and the actual receiver. Such data regenerators are generally self-actuating in that they receive the applied information in pulse form and after a short delay of time, regenerate the received information and transmit it onto the next regenerator station or to the final receiving station. Since the purpose of the regenerators is to receive information which may be weak and somewhat distorted and to provide corresponding output signals having little or no distortion therein, it is of importance that the regenerator include means for filtering out or removing various types of noise and error signals and to prevent a cumulative buildup of such errors which might occur through the use of successive regenerators.

It is therefore an object of the present invention to provide an improved data regenerating system.

It is a further object of the present invention to provide an improved digital data regenerator adapted to receive signal information having various types of signal distortion and noise therein and to provide in response thereto a corresponding series of output pulses or signals which are accurately timed and contain the desired information but without the presence of any appreciable noise or distortion.

Another object of the present invention is to provide an improved digital data regenerator which includes an improved signal evaluation apparatus which is used to evaluate each pulse or signal in the train of signals received and to apply signal information derived therefrom to various other parts of the regenerator system in a manner such that complete isolation of the signal input and signal output circuits of the regenerator is achieved.

It is another object of the present invention to provide an improved data regenerating system which eliminates certain types of signal distortion and generation of erroneous information which has posed a problem in the art.

Another object of the present invention is to provide an improved data regenerator which is readily adjustable to perform at various word speeds as well as at various signal bit levels.

An additional object of the present invention is to provide an improved data regenerating system wherein the system output circuitry automatically reverts to a predetermined condition referred to in the art as the "mark" condition in the absence of "space" signals at the input to the regenerator and wherein the signal output circuitry is substantially isolated from the signal input circuitry so that the signals regenerated are not susceptible to errors which might be caused due to fluctuations in the voltage of received signals or certain types of noise information superposed on the input signals applied to the system.

In accordance with the teachings of the present invention signals to be processed and regenerated are applied to a first signal evaluation section of the system which includes a trigger circuit adapted to provide an output signal if the pulse applied to the evaluation section continues for a predetermined length of time. This circuit serves to prevent starting of the data regenerator system in response to spurious signals or noise signals of short time duration which might be caused by various types of interference in the signal transmission system. Thus the first signal evaluation section operates in part like a time delay network in that it generates an output triggering signal if the applied pulse exists for a predetermined length of time. This initial evaluation section further includes a memory circuit which prevents the loss of a bit in the event the applied pulse is momentarily interrupted for a short time interval. The first trigger signal generated by the first signal evaluation section is applied to a second evaluation and time delay section which further delays and evaluates the applied input signal. In the event the trigger signal from the first evaluation section exists for a sufficient length of time to insure identification of the received pulse as being an information signal and not a short time duration noise signal, the second signal evaluation and delay section provides a second trigger signal which is applied to a main output signal gating section of the system. In response to this second trigger signal the gating section generates gate signal for a predetermined length of time corresponding to the time required for receiving the start signal as well as all of the individual bits or pulses required to make up a given character.

Upon initiation of the signal from the gating section a timing network is energized which provides a train of pulses which are very accurately timed and which are repeatedly applied to the output circuitry of the system. Simultaneously the signals provided from the first signal evaluation section are applied to the signal output circuitry in a manner such that the level of the output circuit is at a first voltage in the absence of a given signal level at the output of the first evaluation section at the time of occurrence of a timing pulse and is changed to a second level in the event there is a second signal level being provided by the first signal evaluation section at the time of occurrence of a timing pulse. Thus the series of timing pulses in effect determines the point in time during the occurrence of an information pulse at which a sample is made for determining the level to which the signal output circuit should be placed. By using only that information which has been initially evaluated by the first signal evaluation section, it is possible to completely isolate the signal reconstruction section from the signal input circuit and therefore many types of errors heretofore found to be of trouble are completely eliminated. In addition, the signal gating section may be coupled with the signal output circuitry in a manner such that if there is no signal generated by the gating section, the signal output circuit automatically returns to a predetermined condition. By using this technique it is found that additional erroneous signals are avoided in the signal output circuit since the presence of the gating signal is necessary to have the level of the output circuit changed in response to a change in level of the input signals applied to the system. This further prevents any "sneak through" of erroneous pulses from the input circuitry.

The data regenerator incorporates an improved timing correlation section which makes use of a pair of multivibrator circuits in a manner to provide accurately spaced timing pulses required for the system. The system is adapted to operate at various repetition rates of applied input signals by means of adjustment of the time constants in the evaluation sections and the timing correlation section as well as in the gating section. The usual crystal oscillator and frequency dividing networks commonly used in the prior art are eliminated and therefore a lower cost as well as a more compact system is provided without sacrificing system accuracy.

The above as well as additional advantages and objects of the present invention will be more clearly understood from the following description when read with reference to the accompanying drawings.

Figure 2:
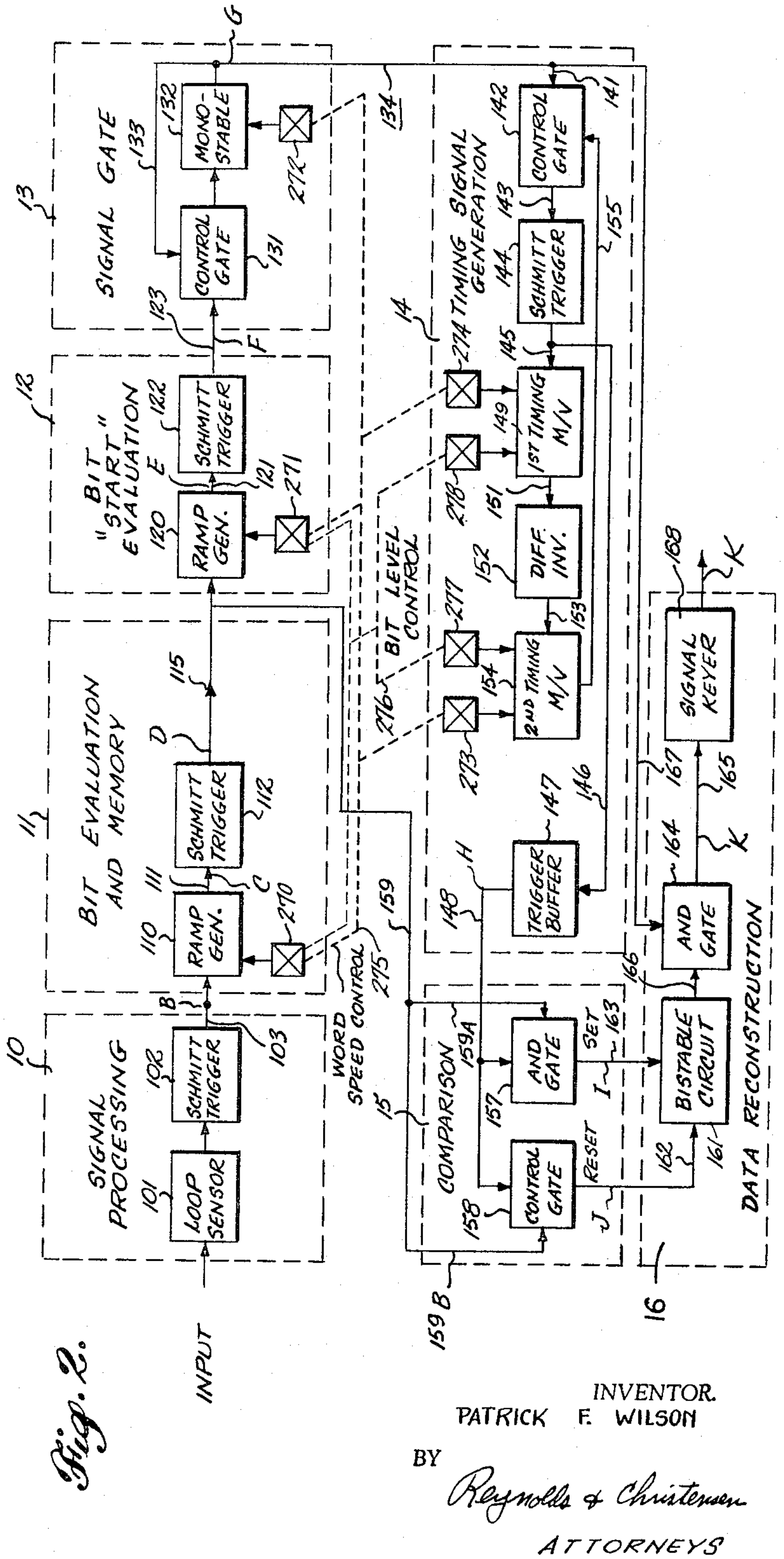
Figure 3:
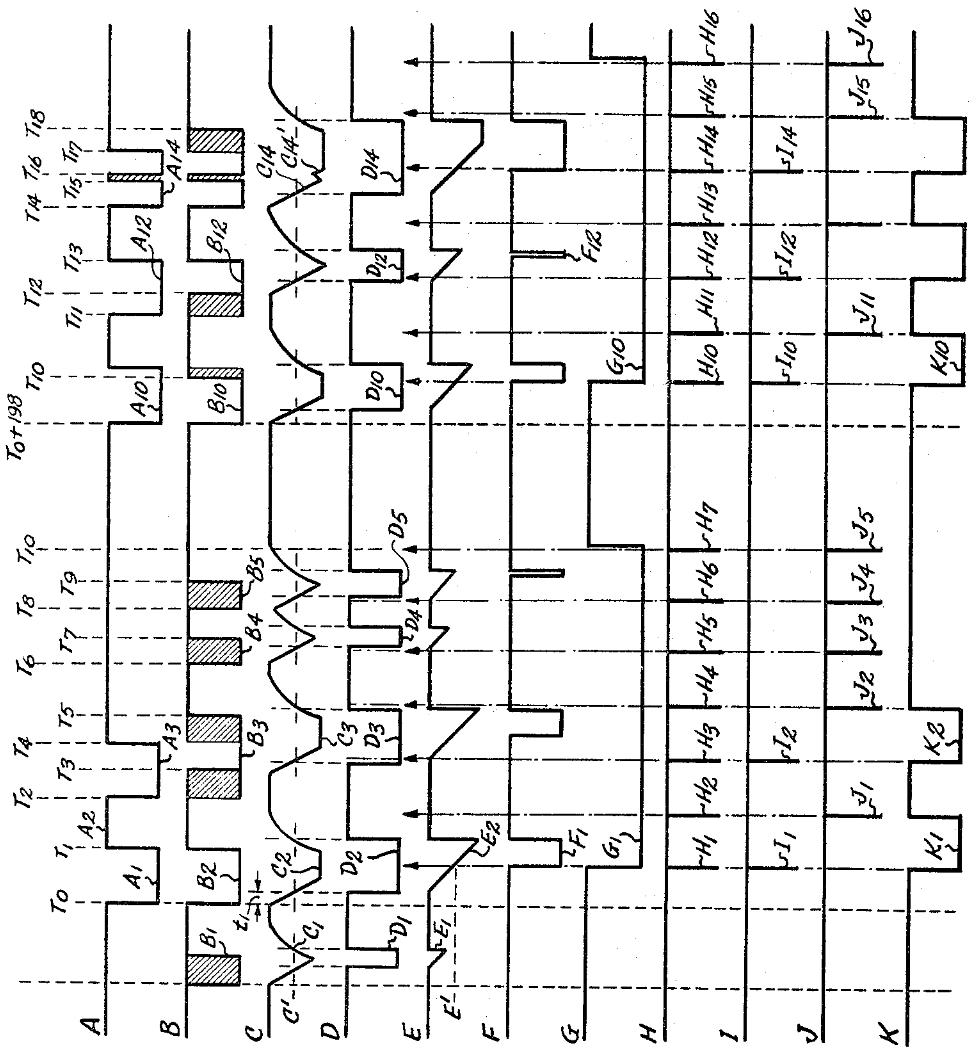
Figure 4:
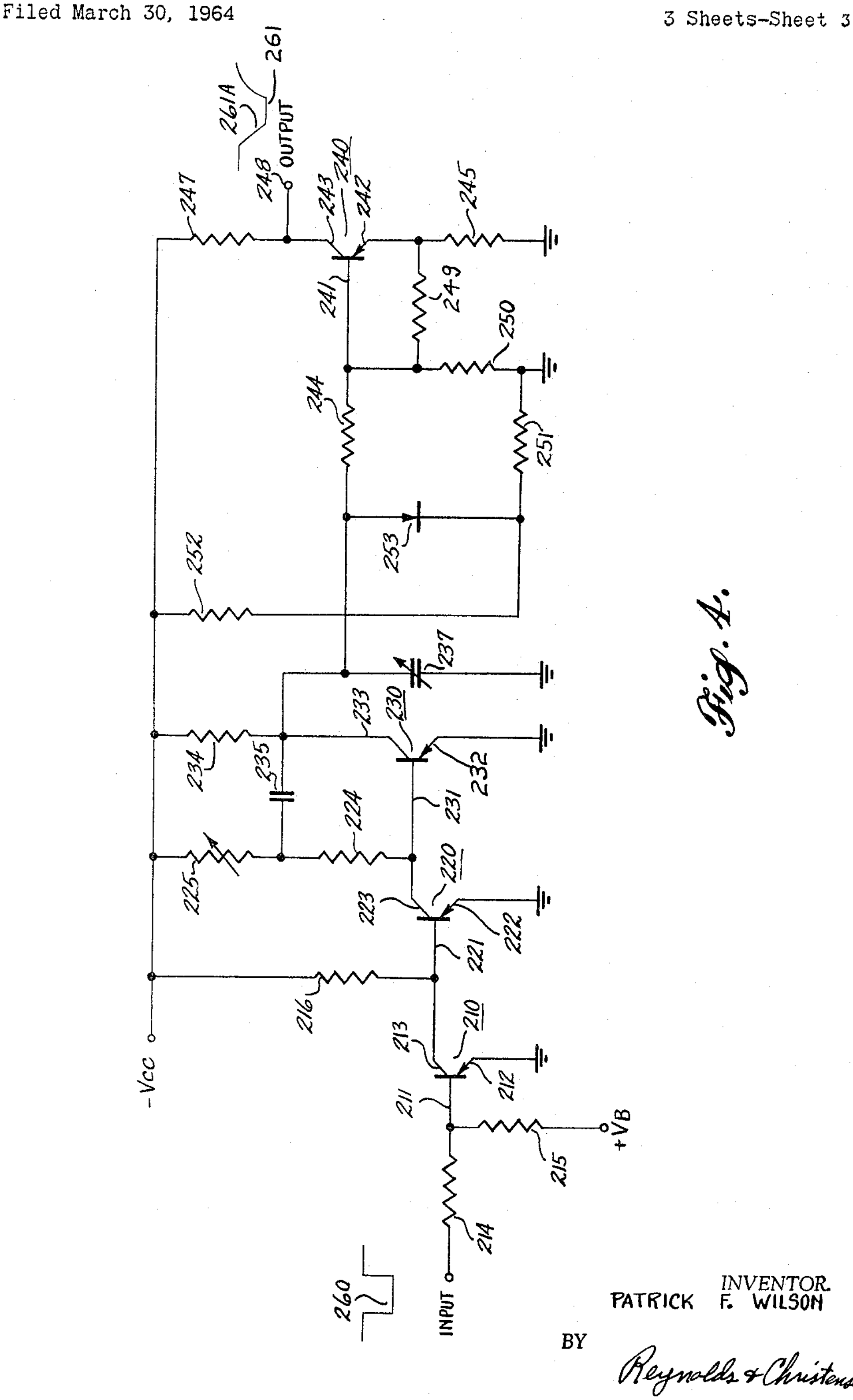

In the drawings FIGURE 1 is a block diagram illustrating in general the various sections and manner of electrical interconnection thereof for providing an improved regenerator system;

FIGURE 2 is a block diagram illustrating with more particularity the various components used and the manner in which such components are interconnected for achieving the advantages of the present invention;

FIGURE 3 is an illustration of typical signal wave forms at different points in the system of FIGURE 2 with voltage being plotted versus time to illustrate in detail some of the various types of distortion and noise eliminated by the use of the system of the present invention; and FIGURE 4 is a schematic circuit diagram showing in greater detail a signal evaluation section adapted for use in the system illustrated in FIGURE 2 and in particular illustrating the manner in which the signal evaluation section is adapted to provide a memory function.

Referring now to the drawings and in particular to FIGURE 1, there is illustrated an embodiment of the present invention which includes a signal processing network 10 adapted to receive input signals which generally are of the bilevel type referred to in the art as "mark" and "space" signals. As is common in many widely used pulse communication systems the input signal level is normally at the mark level and at the initiation of each transmission of signal informaton a start signal corresponding to a change in the level of the input from the mark condition to the space condtion in transmitted. Keyed D.C. pulses are frequently used in the signal generating networks so that square wave pulses are generated. However as a result of the inductance of long transmission lines it is found that the sharp rising and trailing edges of the desired pulses are often changed to sloping signals as well as to other types of distorted signals having various type of noise thereon as discussed hereinafter. Thus the initial signal processing network 10 may include a signal level triggering circuit such as the well known Schmitt trigger circuit which is responsive to input signals of a predetermined level to generate an output signal in the form of a fast rising voltage pulse. Such pulses are applied to a first evaluation and memory network 11. The evaluation and memory network 11 is used to evaluate the input signals and prevent initiation of the operation of the regenerator in response to spurious signals or noise signals which are of a duration shorter than a preselected minimum. After it is determined by the evaluation and memory network 11 that the pulse received is longer in duration than said minimum a signal is applied to a second signal evaluation (or "start" evaluation) network 12 which operates to further delay and evaluate the start input signal to make certain that the system is not operated in response to noise or error signals. As discussed with more detail hereinafter, the use of the two evaluation networks 11 and 12 having relatively short delay times has several advantages over the use of a single long time delay network. In the system of the present invention the time delays provided by the two initial signal evaluaiton networks may be varied so that the system can be used to regenerate information signals at various repetition rates.

The "start" evaluation network 12 serves to apply a second or delayed trigger signal to the gating network 13 which is responsive to such second trigger signal to generate a gating signal. The gating signal exists for a predetermined length of time corresponding to the length of time for receipt of a complete set of signals representing a given character. In one specific embodiment of the present invention the signal gating network 13 is in the form of a monostable multivibrator circuit which is responsive to the trigger signal provided by the start evaluation network 12 to generate a gate signal in the form of a voltage level which exists for a predetermined length of time corresponding to the time required for receipt of all of the pulses for a given character. The initial change in signal level at the output circuit of the gating network 13 serves to trigger into operation a timing network 14 which then generates a series of equally spaced output signals referred to as timing pulses. These timing pulses are applied sequentially to a signal comparison network 15. At the same time information regarding the state of the output of the evaluation network 11 is applied by circuit 11A to the comparison network. If during the occurrence of a timing pulse at the comparison network 15 there is present at the output of the first evaluation and memory nework 11 a signal level corresponding to a "space" condition, the comparison network 15 passes a signal of appropriate level to a reconstruction network 16 which in turn serves to provide a "space" output signal in its output circuitry. If at the time of occurrence of one of the timing pulses in the comparison network 15 the level of the signal at the output circuit of the first evaluation and memory network 11 corresponds to the mark condition, then the signal reconstruction network 16 maintains an output signal level corresponding to the mark condition.

Since the regenerator in the embodiment illustrated is adapted for providing information in the form of two voltage levels, a flip-flop or bistable circuit is readily adapted for use in the signal output portion of the system. To make certain that the signal output level returns to the mark condition following receipt of all of the pulses for a given character, the gating signal generated by the gating network 13 may be used as a control signal in the reconstruction network 16 with the operation thereof being such that in the absence of the gating signal at the output circuit from the gating network 13 the reconstruction network 16 will assume its mark condition. In the absence of such a gating signal it will therefore be seen that the level of the output signal provided by the regenerator corresponds to the level of the mark condition at the input and yet the signal output circuitry is completely isolated from the input. Therefore, the system operates in a manner such that there is no direct path for signals from the input circuit to the output circuit. That is, the signal processing and signal reconstruction sections utilize only information signals which have passed through the evaluation and memory network 11. As described in detail hereinafter with reference to specific types of noises which frequently arise in the operation of such systems, this leads to a materially improved system.

Referring now to FIGURE 2, there is illustrated a system similar to that illustrated in FIGURE 1 but including further detail of the various components of the system of FIGURE 1. Thus it will be seen in FIGURE 2 that the signal processing section 10 includes a loop sensor 101 which receives input information from a direct current line or from a suitable radio receiver and applies appropriate signals to a trigger circuit shown for purpose of illustration as a Schmitt trigger circuit 102. The signal output circuit 103 of the Schmitt trigger circuit 102 serves to apply signals of one level or another to a ramp generator 110 in the bit evaluation and memory section 11. As discussed in more detail hereinafter with reference to FIGURE 4, the ramp generator 110 is preferably constructed so that a memory function is achieved to prevent the drop out or loss of signal information which would otherwise be lost if after the initiation of an applied pulse from the Schmitt trigger circuit 102 an interruption momentarily occurred in the information applied to the loop sensor 101. In response to the leading edge of the pulse provided by the Schmitt trigger circuit 102 over the circuit 103 the ramp generator 110 starts to produce an output voltage which changes substantially linearly with respect to time as long as the trigger pulse is present. To clarify the manner of operation of the embodiment shown in FIGURE 2 reference will simultaneously be made to the various voltage wave forms shown in FIGURE 3. It will be seen in FIGURE 3 that in response to the signals B provided on the circuit 103 to the ramp generator 110 the wave form C is generated by the ramp generator and provided over the circuit 111 to a Schmitt trigger circuit 112 which is part of the bit evaluation and memory network. As seen in FIGURE 3, the triggering level of the Schmitt trigger circuit 112 is adjusted such that as the level of the signal C drops on its linear portion, a voltage level C′ is reached which corresponds to the triggering level for the Schmitt trigger circuit 112. In response thereto the Schmitt trigger circuit 112 generates a first signal indicated in FIGURE 3 as the signal $D_1$ which is applied through the bit evaluation and memory output circuit 115 to a second ramp generator 120 which is included in the bit "start" evaluation network 12. The ramp generator 120 can be any of a number known in the art as, for example, a Miller integrator or circuit of the type which provides a linear change in output voltage in response to the continued presence of a signal above a certain amplitude. Thus it will be seen in FIGURE 3 that the second ramp generator 120 produces the wave form E in response to the rectangular pulses of the wave form D which are applied thereto through the circuit 115. When the level of the wave form E reaches the voltage E′ as indicated in FIGURE 3 the Schmitt trigger circuit 122 is operated and the wave form illustrated at F in FIGURE 3 is generated. When the Schmitt trigger circuit 122 is operated the pulses of the wave form F are applied over the circuit 123 to one of the input circuits of a control gate 131 in the signal gate section 13. As long as the control gate 131 has not been inhibited, the signals F are applied to the signal gate generator shown as a monostable circuit 132 which in response to the leading edge of the first signal thereto provides the signal illustrated at G in FIGURE 3. The output signal from the gate generator 132 is fed back through the feedback network 133 and is applied as an inhibiting signal to the control gate 131 to thereby render the signal gate generator 132 nonresponsive to further signals which might be generated by the Schmitt trigger circuit 122. As a result it will be seen in FIGURE 3 that the signal gate generator provides the gate signal G1 for a predetermined length of time. The gate generator is preferably a monostable multivibrator which is triggered to its unstable condition where it remains for said period of time and then reverts to its stable condition.

The signal output circuit 134 from the gate generator 13 will be seen in FIGURE 2 to lead to the signal input circuit 141 in the timing signal generation network 14. The gate signal G is applied as one of the inputs to a normally open control gate 142 and from there through the circuit 143 to a voltage sensitive triggering network shown for purpose of illustration as a Schmitt trigger circuit 144. When the Schmitt trigger circuit 144 is operated an output signal is provided on the circuits 145 and 146. As seen in FIGURE 2, a differentiating network illustrated as a trigger pulse buffer 147 has the circuit 146 connected thereto so that short duration timing pulses illustrated in FIGURE 3 at H will be provided to the comparison section 15 via the circuit 148.

As is well known in the art, a triggering circuit such as the commonly referred to Schmitt trigger is in substance a voltage responsive switch which provides a first signal output level in the absence of a control signal or in the presence of control signals below a predetermined signal level. When the level of the applied control signal to the trigger circuit reaches a predetermined value, the trigger circuit then provides a second level of output signal and maintains such second level as long as the level of the control signal is maintained at least equal to said predetermined level. It will be seen in FIGURE 3 that the gate generator 13 maintains the gate signal $G_1$ for a considerable length of time (described hereinafter) and thus the Schmitt trigger circuit 144 would normally maintain its second level of output signal throughout the duration of the word gate signal $G_1$. However, as stated previously, the output signals from the Schmitt trigger circuit 144 are applied via the circuit 145 to a first timing multivibrator 149 which in response to the change in signal level of the output signal from the Schmitt trigger circuit is placed in its unstable condition where it remains for a length of time determined by its circuit parameters. The trailing edge of the output signal from the multivibrator 149 generated as the first timing multivibrator 149 returns to its stable condition is applied through the circuit 151 to a differentiating network 152 which serves to differentiate said trailing edge and apply an inverted trigger pulse via the circuit 153 to a second timing multivibrator 154. As a result thereof the second multivibrator 154 is triggered and provides an output signal on the circuit 155 which will be seen to be connected as an input circuit to the timing control gate 142 previously described. The signals on the output circuit 155 of the second multivibrator 154 are applied to the control gate 142 in a manner to close the control gate 142 and hence the input signal to the Schmitt trigger circuit 144 is removed. As a result thereof, the Schmitt trigger circuit 144 returns to its normal quiescent condition. The unstable conditions of the two multivibrator circuits 149 and 154 are so chosen (as described hereinafter) that during the time that the second multivibrator 154 is in its unstable condition the first multivibrator 149 as well as the Schmitt trigger circuit 144 are completely returned to their stable conditions. When the second multivibrator 154 returns to its stable condition the inhibiting signal applied to the control gate 142 is removed and therefore the gate signal $G_1$ is again applied through the control gate 142 to the input of the Schmitt trigger circuit 144. The trigger circuit 144 therefore provides a second pulse to the trigger buffer network 147 and to the first timing multivibrator 149 so that the above action is repeated. As a result thereof a second timing pulse shown as the wave form $H_2$ in FIGURE 3 is generated.

From the above it will be seen that as long as the control gate 142 has the gate signal $G_1$ applied thereto said gate 142 will be repeatedly opened and closed in accordance with the condition of the second multivibrator 154. Accordingly, the Schmitt trigger circuit 144 will be repeatedly triggered to provide the accurately spaced timing pulses illustrated at H in FIGURE 3. The time between adjacent timing pulses is determined by the time required for the two multivibrators 149 and 154 to complete their excursions from stable to unstable and back to stable conditions. By utilizing two multivibrator circuits connected in the manner illustrated in FIGURE 2 it will be seen that the Schmitt trigger circuit 144 is permitted to completely recover to its initial condition and that only the leading edges of the pulses generated thereby are utilized by the trigger buffer network 147 to produce the required timing pulses H. The first multivibrator 149 is also completely returned to its stable condition during the time that the second multivibrator 154 is in its unstable condition. Since the trailing edge of the pulse generated by the first multivibrator 149 is differentiated and inverted and used as the triggering pulse for the second multivibrator 154, it will be seen that the second multibivrator 154 is completely returned to its stable condition during the time of the occurrence of the pulse from the first multivibrator 149. The net result is that a very accurate timing system is provided since the various trigger or pulse generating circuits, including the Schmitt trigger circuit 144 and the multivibrator circuits 149 and 154 are initially operated from a stable condition with sufficient time always being provided for complete return of the circuits to their stable conditions before subsequent triggering thereof and yet "hysteresis" or recovery time of the individual circuits does not affect the timing of the output signals.

Thus the recovery time normally associated with such circuits as trigger circuits and multivibrators is avoided and the expense of a crystal oscillator and associated frequency dividing network is not incurred. It is found in practice that utilizing a timing signal generation network such as that illustrated in FIGURE 2 and using conventional transistor components timing pulses accurately spaced at 22 millisecond intervals are readily achieved.

The comparison network 15 will be seen to include the gates 157 and 158 which are directly connected to the output circuit 148 of the timing signal generation section 14. Each of the gates 157 and 158 is adapted to have the signal level of the output signals D from the first bit evaluation and memory section 11 applied thereto. Thus the circuits 159A and 159B which will be seen to be respectively connected to the gates 157 and 158 are connected to lead 159 which is in turn connected to output circuit 155 of the bit evaluation and memory section 11. As seen in FIGURE 2 the gate 157 is labeled as an "And" gate while the gate 158 is labeled as a "Control" gate. These two gates operate in the following manner. When the gate 157 is simultaneously provided with the signals D and H from the circuits 148 and 159A, a signal is passed therethrough and is applied to the data reconstruction section. In contrast thereto, the control gate 158 provides an output signal to the data reconstruction section only when there is a signal H on the circuit 148 and there is no signal on the circuit 159B. That is, the control gate 158 is inhibited by the presence of an information pulse D in the signal output circuit 115 of the bit evaluation and memory section 11. Thus it will be seen that the gates 157 and 158 are in effect mutually exclusive gates in that one or the other, but never both, of the two gates can provide an output signal during occurrence, and only during the occurrence, of a timing pulse from the timing signal generation section 14.

The data reconstruction section 16 will be seen to include a data bit generator in the form of a bistable circuit 161 having signal input circuits 162 and 163 respectively extending from the gates 157 and 158 from the comparison section 15. While other types of devices are suitable for use within the data reconstruction section 16, it is found in practice that a conventional bistable circuit works well in that in the data regenerator illustrated herein, a two level signal system is utilized and hence the two levels of a conventional bistable circuit can be used to indicate the required two signal levels. In accordance with the terminology commonly used in the art, signals from the gate 157 are used to "set" the bit generator flip-flop 161 while signals from the control gate 158 are used as "reset" signals. As described more clearly hereinafter, the "reset" condition of the bistable circuit 161 corresponds to the "mark" condition while the "set" condition corresponds to the "space" condition. It will be seen in FIGURE 2 that the data reconstruction section 16 further includes a signal output gate shown for purpose of illustration as an "AND" gate 164 having an output circuit 165. It will be seen that the "AND" gate 164 has signal input circuits 166 and 167 connected thereto with the circuit 166 being connected to the set side of the data bit generator or flip-flop 161 and the circuit 167 being connected to the signal output circuit 134 of the gate generator 132. The output of AND gate 164 is applied to the signal keyer 168 which is normally in its "mark" condition but changes to a condition for generation of a "space" signal in response to a signal from the gate 164. In the absence of a "space" signal from the gate 104 the signal keyer 168 returns to its "mark" condition. Thus it will be seen that by having the signal gate 13 control the "AND" gate 164 and hence the signal keyer 168 "space" signals can only be generated at a time when it has been determined by the two evaluation sections that true signal transmission is taking place.

Referring now to FIGURE 2 and to the wave form of FIGURE 3, an example of the manner of operation of the system will be described. For purpose of illustration the system will be described as operating in the conventional code system wherein each character is represented by a combination of five mark and/or space signals, each of which is 22 milliseconds wide, together with a start signal corresponding to an initial change in signal level from mark to space which lasts for 22 milliseconds, and a terminating stop signal corresponding to a 31 millisecond mark condition. The normal or steady state signal level condition corresponds to the mark condition with the first 22 milliseconds of the space condition being used as a start signal. In the example now to be given 163 milliseconds is required for the complete transmission of each character.

In FIGURE 3 the wave form A is a transmitted signal of the two-level type commonly in use in pulse transmission systems at the present time. In the wave forms of FIGURE 3 it will be noted that negative going signals are illustrated throughout, but of course it will be obvious that the teachings of the present invention are not confined to a specific direction of voltage change. Wave form B represents a typical signal as received by the data regenerator of the present invention and passed on by the Schmitt trigger circuit 102 and includes various types of distortion and noise which might arise as a result of dirty contacts, defects in the transmitter, as well as from noise introduced along the transmission line. For purpose of illustration an erroneous start signal is shown as being received by the data regenerator with the Schmitt trigger circuit 102 of FIGURE 2 providing the signal $B_1$ to the first ramp generator 110 in the first bit evaluation and memory section 11. It will be seen that the first ramp generator 110 produced a linearly decreasing voltage indicated as the pulse $C_1$. When the voltage of signal C drops to the level C′ the Schmitt trigger circuit 112 in the first evaluation section is operated and the pulse $D_1$ is generated thereby. Signal $D_1$ is applied to the ramp generator 120 in the bit start evaluation section and as a result thereof the signal $E_1$ is produced. The signal $B_1$ is shown as being less than one-half of the normal 22 millisecond pulse width and thus it will be seen that the signal $C_1$ rises above the firing level C′ for the Schmitt trigger circuit 112 after a time such that the signal $D_1$ generated by the Schmitt trigger circuit 112 does not exist long enough for the signal $E_1$ produced by the ramp generator 120 to reach a voltage of E′ which corresponds to the trigger level for the Schmitt trigger circuit 122. As a result thereof the Schmitt trigger circuit 122 does not provide the required enabling signal for the signal gating section 13 in response to receipt of the false start signal $B_1$. It should be noted that the slope of the leading edge or linear portion of the signal $C_1$ is greater than the slope of the falling portion of the signal $E_1$ and that the Schmitt circuit 112 triggers after the signal $C_1$ has existed for a time interval which is shorter than the required existence of the signal $E_1$ for the triggering of the Schmitt trigger circuit 122. It should also be noted that when the signal $B_1$ terminates and returns to its quiescent level the signal $C_1$ returns to its quiescent level in an exponential fashion rather than linearly or rather than by means of an immediate flyback. The exponential return of the signal $C_1$ to its quiescent condition is adjusted such that the duration of the pulse $D_1$ provided by the first Schmitt trigger circuit 112 in the bit evaluation and memory section 11 corresponds to the duration of the input signal $B_1$. The exponential rise of the voltage level of the signals C has an advantage since, as is well known in the art, most voltage level triggering circuits (such as the Schmitt trigger circuit) have the characteristic of triggering on a given voltage level but requiring a return of the control signal to a slightly different level than the triggering level for turning the circuit off. By using an exponential rise of the signals C it will be seen that the triggering level C′ is reached more rapidly than if a linear return were used and hence the voltage of the signal $C_1$ is able to return to the "turn off" level above C′ in the time interval corresponding to the pulse width $B_1$.

At a time $T_0$ it will be seen that the first true start signal $A_1$ is transmitted and is received as the start signal $B_2$. After a time interval $T_1$ the signal $C_2$ provided by the first ramp generator 110 reaches the triggering voltage level C′ for the Schmitt trigger circuit 112 and therefore the Schmitt trigger circuit 112 provides the signal $D_2$. The signal $D_2$ applied to the ramp generator 120 starts a linear decline in the output signal level of the ramp generator 120 applied to the Schmitt trigger 122 as the signal $E_2$. When the level of the signal $E_2$ reaches the triggering level E′ the Schmitt trigger circuit 122 is fired so that the signal gating section 13 is provided with an initiating pulse $F_1$. As illustrated in FIGURE 2, the signal gating section 13 includes a monostable multivibrator 132 which is responsive to the leading edge of the pulse $F_1$ to change to its unstable condition and provide the signal $G_1$ of FIGURE 3. The resistor-capacitor feedback network in the monostable multi-vibrator 132 is adjusted so that at the end of 132 milliseconds the multivibrator 132 will return to its stable condition. A signal $G_1$ of a time duration equal to 132 milliseconds is therefore provided.

The leading edge of the signal $G_1$ is applied through the open control gate 142 in the timing signal generation section 14 so that the Schmitt trigger 144 therein is immediately triggered to provide a first signal to the trigger buffer 147 resulting in the first timing pulse $H_1$. As previously described, the timing signal generation section 14 then provides a series of equally spaced timing pulses $H_1$–$H_7$ at 22 millisecond time while the signal $G_1$ is present at the control gate 142.

It will be seen that at the time of occurrence of the first timing pulse $H_1$ the voltage level of the signal output circuit 115 from the first bit evaluation and memory section 11 corresponds to the signal level of the pulse $D_2$ and therefore the AND gate 157 is provided simultaneously with the required gating signals so that a "set" signal $I_1$ is applied via the circuit 163 to the bistable circuit 161. As a result thereof the bistable circuit 161 changes from its reset condition to its set condition corresponding to the space condition. The set signal level of the bistable circuit is applied to the AND gate 164 at the same time as is the signal $G_1$ from the gate network. As a result thereof the output of the AND gate 164 as well as of the signal keyer 168 changes to the space condition illustrated by the signal K in FIGURE 3.

From the above it will be seen that the start signal $A_1$ caused the data regenerator to provide a corresponding start output signal $K_1$. At time $T_1$ the input signal level is indicated as changing back to the mark condition to provide the mark signal $A_2$. In response thereto the signal B returns to its quiescent level, and the Schmitt trigger circuits 112 and 122 return to their normal conditions as indicated. It should be noted however that the monostable multivibrator 132 in the signal gating section 13 has its signal output circuit 134 coupled by means of the circuit 133 with its control gate 131 so that even though the signal $F_1$ provided by the Schmitt trigger circuit 122 is terminated the monostable multivibrator 132 is not responsive to such voltage change at the input thereto. This feedback further renders the monostable multivibrator 132 insensitive to any additional output pulses which might be generated by the Schmitt trigger circuit 122 during the occurrence of the gating signal $G_1$. Thus the multivibrator 132 is in effect isolated from further input triggering signals which aids in stabilizing the time interval of the signal $G_1$. It will be noted that when the second timing pulse $H_2$ occurs the signal level in the output circuit 155 of the bit evaluation memory section 11 corresponds to the mark condition and therefore the AND gate 157 does not have the required two signals applied thereto for opening the gate. The signal $D_2$ was previously applied to the control gate 158 over the lead 159B to serve as an inhibiting signal to the control gate 158. However, at the time of occurrence of the second timing pulse $H_2$ it will be seen that the signal $D_2$ has terminated with the voltage level of the wave form D returning to its quiescent or mark condition. Therefore the control gate 158 is in an opened condition so that upon occurrence of the second timing pulse $H_2$ a reset signal $J_1$ is applied over the circuit 162 to the bistable circuit 161 causing return of the bistable circuit to its reset or mark condition. As a result thereof one of the required inputs for the AND gate 164 is removed and the signal keyer 168 returns to its mark condition. While various types of signal keyers can be used it is found that a simple reed switch having a fast signal response time works well in the system and therefore follows faithfully in time the changes in condition of the bistable circuit 161 during presence of the gate signal $G_1$.

At time $T_2$ the transmitted signal changes from its mark to its space voltage level and remains at the space condition for 22 milliseconds corresponding to the second space signal $A_3$. For purpose of illustration it is indicated in FIGURE 3 that the change from mark to space is not received by the Schmitt trigger circuit 102 in the signal processing section 10 until time $T_3$. This is frequently referred to as mark bias distortion and represents a typical type of distortion in such systems. When the Schmitt trigger circuit 102 does trigger at the time $T_3$ it will be seen that the ramp generator 110 starts to generate the signal $C_3$ with the voltage level thereof dropping to the point C′ to cause triggering of the Schmitt trigger circuit 112 for generation of the signal $D_3$. It will be seen that as long as the time elapsed between $T_2$ and $T_3$ is such that the signal $D_3$ exists at the time of occurrence of the third timing pulse $H_3$ there will be no loss of information caused by the delay of the signal $B_3$. Generally the time of occurrence of the first timing pulse $H_1$ is selected by adjustment of the time delays in the first and second signal evaluation sections 11 and 12 to be such that the initial timing pulse $H_1$ occurs at approximately the center of the signal $D_2$ representing the "start" signal. Assuming this to be the case, it will be seen that if the time interval between $T_2$ and $T_3$ is less than 11 milliseconds the signals $D_3$ and $H_3$ will exist simultaneously so that the gate 157 is simultaneously provided with the two signals required for it to pass a signal $I_2$ to the bistable circuit 161. When the bistable circuit changes to its set condition the signal keyer 168 changes to its space condition indicated at $K_2$.

In the example of FIGURE 3 it was assumed that the second signal $B_3$ had been delayed by a time less than 11 milliseconds and therefore it will be seen that the signal D3 provided by the Schmitt trigger circuit 112 terminates at time $T_5$ prior to occurrence of the fourth timing pulse $H_4$. As a result thereof the control gate 158 will be open and the gate 157 closed at the time of occurrence of the timing pulse $H_4$ so that the bistable circuit 161 will be reset to its mark condition and the keyer 166 returned to its mark condition. The advantage of the exponential rise of the voltage of the signal C should be noted at this point since it will be seen that if a linear rise of the voltage level of the pulse $C_3$ occurred, the voltage level required for returning the Schmitt trigger circuit 112 to its normal or mark condition would not occur until after the occurrence of the fourth timing pulse $H_4$. If that happened it will be seen that the AND gate 157 would have been opened so that the bistable circuit 161 would have received a set signal rather than a reset signal and hence an error would have occurred in the output pulse train. Thus by using a linearly falling voltage at the leading edge of the signals which are used to trigger the Schmitt circuit 112 and an exponential return of the voltage it will be seen that maximum delay in the received signals can be tolerated without the generation of an erroneous output.

For purpose of illustration it is indicated that during the time interval from $T_6$ to $T_7$ while the transmitter remains in its mark condition the signal processing section receives noise information giving rise to the signal $B_4$ in the output circuit 103 of the Schmitt trigger circuit 102. It will be seen that by the time the ramp generator 110 in the bit evaluation section 11 drops to the voltage $C'$ to fire the Schmitt trigger circuit 112 and produce the signal $D_4$ the fifth timing pulse $H_5$ will have occurred. Since at the occurence of the fifth timing pulse $H_5$ the signal $D_4$ had not occurred, the control gate 158 would be uninhibited and hence the reset signal $J_3$ would have been applied to the bistable circuit 161 which as previously indicated was in its mark or resent condition. It should be noted that the time interval $T_6$ to $T_7$ actually includes the time during which the fifth timing pulse $H_5$ occurs and yet an erroneous space condition in the output of the system is avoided. Thus the advantage of using only those signals which have been evaluated by the first bit evaluation section 11 is illustrated. In systems wherein the input signals are directly used for gating output signals the signal $B_4$ (or the signal received and giving rise to $B_4$) would cause an erroneous change from mark to space in the signal output network.

For purpose of illustration a second error signal is shown as occurring during the time interval $T_8$ to $T_9$ giving rise to the second error signal $B_5$ with the time of occurrence of the signal $B_5$ being such that the sixth timing pulse $H_6$ occurs prior to the time that the Schmitt trigger circuit 112 produces the signal $D_5$. Thus it will again be seen that even though the error signal occurs at a time which coincides with the occurrence of the timing pulse $H_6$ the control gate 158 remains uninhibited and the reset pulse $J_4$ is properly applied to the bistable circuit 161.

At time $T_{10}$ the gating signal $G_1$ terminates after having existed for 132 milliseconds. It will be noted that the level of the transmitted signal A remains at the mark condition. As indicated in FIGURE 2, when the gating signal $G_1$ terminates, one of the required inputs for the AND gate 164 in the data reconstruction section is removed and therefore the signal keyer 168 immediately returns to its mark condition regardless of the condition of the bistable circuit 161. For purpose of illustration it is shown in FIGURE 3 that the gating signal $G_1$ terminates shortly after the occurrence of the seventh timing pulse $H_7$ indicating that the gating signal $G_1$ has existed for slightly longer than 132 milliseconds and therefore the seventh timing pulse takes place. It will be seen that the occurrence of the seventh timing pulse $H_7$ is at a time when the Schmitt trigger circuit 112 is in its normal or mark condition and hence the control gate 158 applies the reset signal $J_5$ to the bistable circuit 161. This has no effect on the bistable circuit since prior to occurrence of the signal $J_5$ the bistable circuit was already in its mark condition.

It should be noted that if at time $T_{10}$ corresponding to the end of the occurrence of the signal representing the fifth bit of information (following the start signal) the system had been in a space condition with the Schmitt trigger 112 providing a space signal the bistable circuit 161 would have been in its set condition corresponding to the space condition. Under such conditions if the gating signal $G_1$ occurs slightly late in time and the fifth space signal is delayed the AND gate 157 could transmit an additional set signal to the bistable circuit 161. It will be seen however that immediately thereafter when the gate signal $G_1$ does terminate, the AND gate 164 is opened and the signal keyer 168 returns to its mark condition regardless of the condition of the bistable circuit.

Upon transmission of the next character the initial mark to space signal corresponding to the usual start signal always gives rise to the first timing pulse $H_1$ and the corresponding set signal $I_1$ so that at the start of every character the bistable circuit 161 is initially placed in its set condition. Thus the fact that the bistable circuit might remain in its set condition at the end of the gate signal $G_1$ has no effect on the system.

If it is asssumed that the gating signal $G_1$ terminates slightly before the occurrence of the seventh timing pulse $H_7$ it will be seen that the associated opening of the AND gate 164 caused by termination of the gating signal $G_1$ causes return of the signal keyer 168 to its mark condition. Thus it will again be seen that the condition of the bistable circuit 161 at termination of the gating signal $G_1$ will not prevent or affect return of the signal keyer 168 to its mark condition. As is well known in the art, low cost conventional circuit components can be used to construct a conventional monostable multivibrator which will immediately or substantially immediately change from a stable condition to an unstable condition in response to an applied signal but the exact timing of the return of the circuit to its stable condition may vary slightly with temperature. Thus by using a system such as that disclosed herein, it will be seen that a slight change in the time of termination of the gating signal as provided by a conventional monostable circuit has no effect on the correct operation of the system.

To further illustrate the manner of operation of the data regenerator of the present invention and the advantages thereof, there is illustrated in FIGURE 3 the start of a second character at time $T_0$ plus 198 milliseconds. The usual "start" signal is indicated by the wave form $A_{10}$ with the space condition existing for 22 milliseconds in the example given. The initiation of the gating signal $G_{10}$ as well as the starting of the timing pulses and the initial setting of the bistable circuit 161 in the data reconstruction section to its set condition (corresponding to the space condition thereof) takes place in the manner previously described. However it will be seen that while the transmitted signal actually terminates after 22 milliseconds the system receives a distorted signal and therefore at time $T_{10}$ (prior to actual termination of the signal $A_{10}$) the received signal terminates. The Schmitt trigger circuit 102 in the signal processing section therefore terminates its pulse $B_{10}$. It will be seen that the early termination of the signal $B_{10}$ at time $T_0$ does not cause an error in the output signal generated by the system since the second timing pulse $H_{11}$ occurs at a time when the signal $D_{10}$ has terminated and thus the control gate output signal $J_{11}$ is applied as a reset signal to the bistable circuit 161. Therefore the signal keyer 168 in the data reconstruction section returns to the mark condition.

At time $T_{11}$ a second mark to space change occurs in the transmitted signal level A giving rise to the second space signal $A_{12}$. However again due to noise in the transmission system (as for example a sticking contact in the transmitter) the signal processing section does not receive the mark to space change until time $T_{12}$. As in the previous examples, the shaded portion in the wave form B indicates the amount of distortion in the signal received. The time interval between $T_{11}$ and $T_{12}$ is illustrated as being less than 11 milliseconds and therefore the Schmitt trigger 112 provides its output signal $D_{12}$ prior to the occurrence of the third timing pulse $H_{12}$. Therefore at the time of occurrence of the timing pulse $H_{12}$ the AND gate 157 is provided with the signals $D_{12}$ and $H_{12}$ so that a set signal is applied to the bistable circuit 161 causing the signal keyer 168 to change to its space condition. At time $T_{13}$ when the space signal $A_{12}$ in the transmitter returns to the mark condition the faulty transmission which caused the delay in receipt of the mark to space change has been removed and therefore the space signal $B_{12}$ provided by the Schmitt trigger circuit 102 terminates at time $T_{13}$. It is noted that the net result is a signal $D_{12}$ which is of a width substantially less than the normal 22 milliseconds. It should also be noted that this gives rise to a very short time interval pulse $F_{12}$ at the output of the Schmitt trigger circuit 122 in the bit "start" evaluation section 12. However, since the comparison and data reconstruction sections operate using the signals provided in the output circuit 115 of the first bit evaluation and memory section 11 and the accurately spaced timing pulses indicated at H, it will be seen that correct reconstruction of the applied signals is maintained. It should be noted that if a single long time delay circuit was used in the evaluation section the occurrence of the signal $F_{12}$ would be too late for being simultaneous with the third timing pulse $H_{12}$ and therefore an error would occur.

At time $T_{14}$ a mark to space change occurs in the transmitted signal giving rise to the space signal $A_{14}$. In the manner previously described the system reacts to the change from mark to space with the ramp generator 110 providing the signal $C_{14}$ which triggers the Schmitt circuit 112 to provide the signal $D_{14}$. For purpose of illustration it is indicated that during the time from $T_{15}$ to $T_{16}$ and at approximately the center of the occurrence of the space signal $A_{14}$ a signal "dropout" occurs. If the system directly sampled the condition of the input at the center of the input pulses it will be seen that such a dropout or loss of signal during the time interval $T_{15}$ to $T_{16}$ would give rise to an error in the output. However due to the memory characteristic of the ramp generator 110 and associated expontential rise in the voltage thereof, the signal $C_{14}$ does not immediately return to its mark condition when the dropout occurs but instead merely returns by the small amount indicated at $C_{14'}$. Since the voltage level at $C_{14'}$ is still below the threshold level for the Schmitt trigger circuit 112, it will be seen that the signal level of the Schmitt trigger circuit 112 remains as indicated at $D_{14}$. Therefore when the fifth timing pulse $H_{14}$ occurs, the signal $D_{14}$ will be present and hence the AND gate 157 will provide the required pulse $I_{14}$ to cause the bistable circuit 161 to be "set." The signal keyer 168 will therefore change to its "space" condition as is required if the data regenerator is to accurately reproduce the information transmitted thereto.

At time $T_{17}$ the level of the transmitter signal A returns to its mark condition but as illustrated at B due to transmission noise the signal being received terminates at a later time and hence the signal produced by Schmitt trigger circuit 102 terminates at time $T_{18}$. Therefore the signal $D_{14}$ provided by the Schmitt trigger circuit 112 is of a greater time width than 22 milliseconds. It will be seen, however, that the pulse $D_{14}$ terminates prior to the occurrence of the sixth timing pulse $H_{15}$ and therefore the AND gate 157 will be closed and the control gate 158 will be opened at the time of occurrence of the pulse $H_{15}$. As a result thereof the control gate 158 will pass the reset pulse $J_{15}$ to the bistable circuit 161 causing said circuit to return to its mark condition. As a result thereof the AND gate 164 is closed and the signal keyer 168 returns to its mark condition. Thus it will be seen that even though due to noise in the system as, for example, that which might be caused by a sticking contact in the transmitter or time delays in the signal transmission network the extension of the pulse to time $T_{18}$ has no effect on the output. In the example of FIGURE 3 after time $T_{18}$ the level of the transmitted information A remains at the mark condition and therefore the signal level of the output data reconstruction section should remain at the mark condition. Since there are no further pulses from the Schmitt trigger circuit 112, it will be seen that the AND gate 157 does not become opened again and therefore there is no way for the bistable circuit 161 to be changed to its set condition. Accordingly, at the time of occurrence of the seventh timing pulse $H_{16}$ the control gate 158 will be opened and a reset signal $J_{16}$ will be applied to the previously reset bistable circuit 161. When the gate signal $G_{10}$ terminates the bistable circuit 161 is in a reset condition and more importantly the signal keyer 168 is in its mark condition. As previously explained, the condition of the bistable circuit 161 when the gate signal pulse $G_{10}$ terminates is of no great importance since the signal keyer 168 automatically returns to its mark condition when the gate signal $G_{10}$ terminates. Furthermore, as previously explained, in systems such as that disclosed herein and in other systems generally in use in the art, the first information transmitted is a start signal corresponding to a change in signal level from the mark to space condition. Therefore the bistable circuit 161 in the system of the present invention is always initially placed in its set condition. Thus it will be seen that the signal keyer 168 at the end of every character transmission returns to its mark condition and yet at the initiation of transmission of every character the "start" signal will always place the signal keyer 168 in its space condition. An additional advantage of the system disclosed thus far should be noted. Since termination of the gate signal G causes reset of the output to mark, the application of a continuous sine wave or a repeating alternation of pulses will result in the output of the system being a repeating series of pulses representative of Y's in the conventional five-level code. Since a change in voltage is required at the input of the gate signal generator to initiate the gate signal, it will be seen that the system automatically provides the required "stop" signal for the print out equipment, said "stop" signal corresponding to a mark condition which lasts for approximately 31 milliseconds, that is the present system remains in its mark condition when the fourth mark to space change occurred in the sine wave input since at that time the signal gate would close. Thus an elongated mark condition is automatically inserted between the set of alternating output signals representative of Y. The system is therefore easily tested by applying a sine wave signal to the input.

Referring now to FIGURE 4 there is illustrated by way of a schematic circuit diagram an improved signal generator adapted for use in the first bit evalution section 11 and having an inherent memory function which prevents the loss of information which might otherwise be caused if an input signal is momentarily interrupted. Since the circuit responds to a rectangular control pulse to generate a signal having a voltage which changes linearly with respect to time it is referred to in the art as a ramp generator. Signals from a Schmitt trigger circuit or other suitable source are applied to the base 211 of transistor 210 through the resistors 214 and 215 which form a base bias network for transistor 210. The resistor 215 is connected to the positive voltage supply indicated at $V_B$ while the emitter 212 of the transistor is connected to a point of reference potential referred to herein as ground. The value of resistors 214 and 215 is so chosen that transistor 210 is normally not conducting. The collector 213 is directly connected to the base 221 of a second transistor 220 (also shown as a PNP type) and to the negative voltage supply —Vcc through resistor 216. The emitter 222 of transistor 220 is grounded and collector 223 is connected to the negative voltage —Vcc through fixed resistor 224 and variable resistor 225. Transistor 220 is normally conductive with the collector 223 thereof being at or close to ground potential.

A third normally non-conductive transistor 230 has its base 231 connected to the collector 223, its emitter 232 grounded, and its collector 233 connected to —Vcc through resistor 234. A first coupling capacitor 235 is connected between collector 233 and the junction of resistors 224 and 225. A second capacitor 237 shown as being variable will be seen to be connected between ground and the collector 233 of transistor 230 and also through resistor 244 to the base 241 of a fourth transistor 240 having its emitter 242 connected to ground through resistor 245. Collector 243 is connected to the negative voltage supply —Vcc through resistor 247 and also has the signal output circuit 248 connected thereto. A resistor 250 connected to the base 241 and to signal ground together with resistors 244 and 234 provide a first voltage divider network while resistors 251 and 252 connected in series between ground and the negative voltage supply —Vcc provide a second voltage divider network. A diode 253 having its anode connected to collector 233 and its cathode connected to the junction between resistors 251 and 252 serves to limit the voltage level to which the collector 233 can rise during conduction of transistor 230. The bias on the base 241 of transistor 240 is so adjusted that transistor 240 is normally conducting to an extent such that its collector 243 is at a negative voltage which is approximately midway between ground and the voltage —Vcc. An emitter-base feedback resistor 249 connected between emitter 242 and base 241 causes the emitter voltage to follow the base in a manner such that transistor 240 operates as a linear inverter with a gain of approximately 0.5.

Transistors 210 and 220 operate in general as an electronic switch so that when a negative pulse indicated generally at 260 is applied to the base 211 of transistor 210 transistor 210 will be rendered conductive and transistor 220 nonconductive, thereby causing collector 223 and base 231 to drop towards the voltage of —Vcc. Transistor 230 therefore starts to conduct and the capacitor 235 which was previously charged in one sense to the voltage between collector 233 (approximately —Vcc) and the junction between resistors 224 and 225 will start to charge in the reverse sense as the collector 233 rises toward ground potential and the junction between resistors 224 and 225 drops towards —Vcc. Simultaneous therewith it will be seen that the previously charged capacitor 237 will be discharged by the current now provided by transistor 230. The net result is that the potential of the collector 233 rises linearly with respect to time and hence the voltage of the base 241 of transistor 240 rises linearly. As a result thereof the voltage of the collector 243 is decreased in a linear fashion to produce the leading edge 261A of the output signal 261. When the voltage on the collector of transistor 230 reaches a value corresponding to the voltage between resistors 251 and 252 the diode 253 will act as a voltage clamp to prevent any further voltage rise. The level of the output signal 261 will therefore remain constant until the input signal 260 terminates.

When the signal 260 terminates collector 213 drops rapidly to —Vcc and collector 223 rises rapidly to ground as transistor 210 is "turned off" and transistor 220 is "turned on." This causes transistor 230 to be rendered nonconductive and hence capacitor 237 starts to charge through resistor 234 and capacitor 235 starts to charge through resistors 224 and 234. As a result the voltage on collector 233 and hence on base 241 decreases exponentially and the voltage of collector 243 connected to the output circuit rises exponentially as indicated by the trailing edge of the signal 261.

From the above it will be seen that the wave-forms indicated at C in FIGURE 3 will be provided by the circuit of FIGURE 4. Thus when signals such as indicated at B in FIGURE 3 are applied to the input of the circuit of FIGURE 4 the time interval between the existence of a given voltage on the linear leading edge of the output signal 261 and the existence of a slightly higher voltage on the exponential trailing edge of the wave-form 261 can be made substantially equal to the duration of the input signal. The required time delay is therefore provided by selecting the level on the linear portion of the signal 261 at which a Schmitt trigger circuit in the bit evaluation section will operate.

The slope of the leading edge 261A as well as the rise time at the trailing edge of the output signal provided by the circuit of FIGURE 4 is readily adjusted by means of the variable resistor 225 and the variable capacitor 237. In practice different sets of resistors and capacitors might be used and switched into the circuit in appropriate combinations in place of the resistor 225 and the capacitor 237.

Since the system of the present invention makes use of timing circuits such as ramp generators and multivibrators, the system is readily adapted for use at different character repetition rates, referred to as word speed, as well as with different code levels (i.e. bits per character). Therefore it will be seen in FIGURE 2 that a "word speed control" is indicated as including the adjustment members 270, 271, and 272 respectively associated with the ramp generators 110, 120 and the multivibrator 132 in the signal gating sections 13, as well as the adjustment members 273 and 274 for the two multivibrators in the timing correlation section 14. The dotted line 275 connecting members 270–274 indicates that each of said members is simultaneously adjusted to control the word speed (or rate at which complete characters are received and regenerated). As is well known in the art, the various resistor-capacitor timing circuits in the various components can be made adjustable to accomplish the desired timing change. In a similar manner the dotted line 276 connecting the adjustment members 270, 271, and 277 and 278 indicates the simultaneous adjustments made in the two ramp generators and the two timing multivibrators in order to permit the receipt and regeneration of a selected member of bits within the time of occurrence of the selected gate signal rate.

There has been disclosed an improved data regeneration system capable of eliminating several types of errors which tend to be caused by various types of noise and signal distortion. The system makes use of improved signal evaluation and timing circuits which not only improve the overall system operation but make possible easy adjustment of the system for use at different word speeds and bit levels. The specific system and circuit disclosed herein have been used for purpose of illustration and for teaching the invention, and various modifications can be made therein without departing from the spirit of the invention.

What is claimed is:

1. A signal regenerator comprising in combination: first signal delay and evaluation means adapted to receive applied signals and to generate a first information signal a predetermined time later in response thereto; second signal delay and evaluation means responsive to said first information signal to generate a second information signal; signal gating means responsive to said second information signal to provide a gating signal; timing signal generation means responsive to said gating signal to provide a plurality of equally spaced timing signals during the presence of said gating signal; signal reconstruction means; first gate means responsive to the simultaneous presence of said first information signal and one of said timing pulses to place said reconstruction means in a first condition; and second gate means responsive to the absence of said first information signal and the occurrence of one of said timing pulses to place said reconstruction means in a second condition.

2. A signal regenerator in accordance with claim 1 wherein said reconstruction means is responsive to the absence of said gating signal to assume its said second condition.

3. A data regenerator comprising in combination: signal evaluation means responsive to a first signal applied thereto for a first time interval to generate a second signal having a time duration substantially equal to the duration of said first signal; means responsive to the existence of said second signal for a second time interval to generate a gating signal which lasts for a length of time sufficient for receipt of a plurality of said first signals; means responsive to said gating signal operative to generate a plurality of timing pulses; and signal output means responsive to the simultaneous presence of a timing pulse and said second signal to provide an output signal of a first level and responsive to the absence of said second signal during the occurrence of one of said timing pulses to provide an output signal of a second level.

4. A data regenerator in accordance with claim 3 wherein said signal evaluation means includes means maintaining said second signal existent when said first signal is discontinued for a predetermined length of time.

5. A data regenerator in accordance with claim 4 wherein said signal output means is responsive to the absence of said gating signal to provide said second level output signal.

6. A signal system comprising in combination: first signal evaluation means adapted to receive an applied signal and to generate a first signal after said applied signal has existed for a first interval of time and to terminate its said first signal after said applied signal has been terminated for a second interval of time; second signal evaluation means coupled with said first signal evaluation means and adapted to provide a second signal after said first signal has existed for a third interval of time; gate signal means coupled with said second signal evaluation means and responsive to said second signal to provide a gate signal for a predetermined interval of time; timing signal generation means coupled with said gate signal means adapted to provide a plurality of timing signals in response to said gate signal; and output signal control means coupled with said timing signal generation means and with said first signal evaluation means adapted to assume a first condition in response to the simultaneous receipt of one of said timing signals and said first signal and to assume a second condition in response to the receipt of a timing pulse in the absence of said first signal.

7. A signal system in accordance with claim 6 and including: output signal generation means having at least two conditions; and means coupled with said output signal control means, with said gate signal means, and with said output signal generation means adapted to maintain said output signal generation means in a selected one of its conditions in the absence of said gate signal and in one or the other of its conditions in accordance with the condition of said output signal control means during the existence of said gate signal.

8. A signal system in accordance with claim 6 wherein said output signal control means includes first and second mutually exclusive gating means each coupled with said timing signal generation means and with said first signal evaluation means, and a bistable circuit coupled with said first and second gating means and adapted to assume one condition in response to a signal from said first gating means and another condition in response to a signal from said second gating means.

9. A signal system in accordance with claim 8 and including third gating means coupled with said bistable circuit and with said gate signal means and adapted to provide a control signal only in response to the presence of said gate signal and said bistable circuit being in its said one condition, and output signal generation means coupled with said third gating means having a normal condition in the absence of said control signal and adapted to assume a different condition during the presence of said control signal.

10. A signal system in accordance with claim 6 wherein said first signal evaluation means is adapted to maintain said first and second intervals of time substantially equal.

11. A data regenerator comprising in combination: first signal evaluation and memory means adapted to receive an information signal and in response thereto to provide a delayed first control signal which terminates subsequent to termination of said information signal; gate signal generating means operative in response to the existence of said control signal for a first predetermined time interval to generate a gating signal; timing signal means responsive to said gating signal to generate a plurality of timing pulses; signal comparison means coupled with said first signal evaluation and memory means and said timing signal means adapted to provide a second control signal in response to simultaneous receipt of said first control signal and one of said timing pulses and to provide a third control signal in response to receipt of one of said timing pulses and the absence of said first control signal; and output signal generating means coupled with said gate signal generating means and said signal comparison means adapted to provide a first output signal in the absence of said gating signal and to provide a second output signal only in response to receipt of said second control signal during the presence of said gating signal.

12. A data regenerator in accordance with claim 11 wherein said output signal generating means includes: an AND gate coupled with said signal comparison means and with said gate signal generating means adapted to provide a fourth control signal in response to receipt of said second control signal and said gating signal, and a signal keyer adapted to provide said second output signal in response to said fourth control signal and to provide said first output signal in the absence of said fourth control signal.

13. A data regenerator in accordance with claim 11 wherein said first control signal is initiated by said signal evaluation and memory means only after said information signal has been applied thereto for a second predetermined length of time.

14. A data regenerator in accordance with claim 13 wherein said first signal evaluation means includes means operative after initiation of said first control signal to prevent termination of said first control signal in response to interruption of said information signal for a length of time which is less than said second predetermined length of time.

15. A data regenerator in accordance with claim 11 wherein said first signal evaluation and memory means includes circuit means responsive to said information signal to generate a voltage signal having a substantially linear leading edge and a substantially exponential trailing edge, and voltage responsive signal generating means coupled with said circuit means and adapted to change from a first condition to a second condition when the amplitude of said leading edge of said voltage signal reaches a first value and to change back to its said first condition when the amplitude of said trailing edge of said voltage signal reaches a second value different from said first value.

16. A data regenerator in accordance with claim 15 wherein said circuit means includes: a current switching device having a control electrode; an impedance element connected in series circuit arrangement with said device; voltage supply means providing an operation potential across said element and said device; a first capacitor connected between said impedance element and said control electrode; a second impedance element connected between said control electrode and said voltage supply means; a second capacitor connected between said first impedance element and said voltage supply means and in parallel with said device; and means for selectively rendering said device conductive and nonconductive.

17. A signal generating circuit responsive to an applied signal to generate an output signal having a first portion the voltage of which changes in a first sense substantially linearly with respect to time and a second portion which changes in a second sense substantially exponentially with respect to time comprising in combination: a current switching device having an output electrode and a control electrode; a first impedance element connected to said output electrode and in series circuit with said device; a first capacitor connected to said output electrode in parallel circuit with said device and series circuit with said element; a second capacitor connected between said electrodes; a third impedance element connected to said second capacitor with said third element and second capacitor being in series circuit with said device and in parallel circuit with said first element; and signal input means coupled with said control electrode adapted to apply a control signal thereto to change the level of conduction of said device for a predetermined time interval.

18. A circuit in accordance with claim 17 and including voltage clamping means connected to said output electrode adapted to limit the maximum voltage change which occurs at said output electrode in response to said control signal.

19. A circuit in accordance with claim 18 wherein said device is a transistor and each of said elements is a resistor.

No references cited.

THOMAS A. ROBINSON, *Primary Examiner.*